3,036,083
CERTAIN 2-PYRIDYL LOWER ALKYL
GUANIDINES
Robert Paul Mull, Florham Park, N.J., assignor to Ciba Corporation, a corporation of Delaware
No Drawing. Filed May 15, 1959, Ser. No. 813,335
5 Claims. (Cl. 260—296)

The present invention concerns pyridine compounds containing guanidino groups. More particularly, it relates to (2-pyridyl)-lower alkyl-guanidines, the acyl derivatives, the salts and quaternary ammonium compounds thereof, as well as process for manufacturing such compounds.

The lower alkyl radical, linking the 2-pyridyl ring with the guanidino group, contains from 1 to 7 carbon atoms and is represented by a lower alkylene radical, which may also be branched. Preferably, the lower alkylene radical contains from 2 to 3 carbon atoms and separates the guanidino group from the pyridyl radical by 2 to 3 carbon atoms; such radicals may be represented by 1,2-alkylene, 1-methyl-1,2-ethylene, 2-methyl-1,2-ethylene and 1,3-propylene. Other lower alkylene radicals are methylene, 1,1-ethylene, 2,3-butylene, 1,3-butylene, 1,4-butylene, 1,5-pentylene and the like.

The guanidino group is preferably unsubstituted. However, the amino, as well as the imino groups of the guanidino portion, may be substituted by lower hydrocarbon radicals, especially lower alkyl, e.g. methyl or ethyl. Such substituted guanidino groups may be, for example, nitrogen-monomethylated, nitrogen-polymethylated, nitrogen-monoethylated or nitrogen-polyethylated guanidino groups.

Acyl derivatives of the new guanidine compounds of this invention are those formed with organic acids, particularly with carboxylic acids, such as lower aliphatic carboxylic acids, for example, lower alkanoic acids, e.g. acetic propionic or pivalic acid, substituted lower alkanoic acids, e.g. dichloroacetic, trifluoroacetic, hydroxyacetic, methoxyacetic or cyclopentylpropionic acid, or lower alkenoic acids, e.g. acrylic acid, or with carbocyclic aryl carboxylic acids, for example, monocyclic carbocyclic aryl carboxylic acids, e.g. benzoic, hydroxybenzoic or aminobenzoic acid, or bicyclic carbocyclic aryl carboxylic acids, e.g. 1-naphthoic or 2-naphthoic acid, or with heterocyclic aryl carboxylic acids, for example, monocyclic heterocyclic aryl carboxylic acids, e.g. nicotinic, isonicotinic or 2-furoic acid.

Salts of the new compounds of this invention are particularly therapeutically acceptable acid addition salts, such as those with inorganic acids, for example, hydrohalic acids, e.g. hydrochloric or hydrobromic acid, or sulfuric or phosphoric acids, or those with organic acids, such as acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxy-benzoic, methane sulfonic, ethane sulfonic or 2-hydroxy-ethane sulfonic. Mono- or polysalts may be formed.

The new guanidine compounds of this invention may also form quaternary ammonium compounds, particularly those with lower alkyl halides, e.g. methyl, ethyl or n-propyl chloride, bromide or iodide, as well as the corresponding quaternary ammonium hydroxides and the salts which may be formed from the quaternary ammonium hydroxides by the reaction with inorganic acids other than the hydrohalic acids or with organic acids, such as those outlined above for the preparation of the acid addition salts.

The new guanidine derivatives of this invention and the salts thereof have antihypertensive properties and may be used as antihypertensive agents to relieve hypertensive conditions, particularly those of neurogenic or renal nature. A particular characteristic of these guanidine compounds is their long-lasting effect, which property is especially desirable in the treatment of hypertensive states. An especially valuable compound is the 2-(2-pyridyl)-ethyl-guanidine of the formula

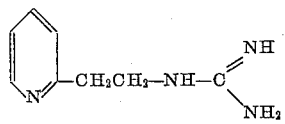

and its therapeutically acceptable salts with inorganic acids, such as mineral acids, e.g. hydrochloric or sulfuric acid, or with organic carboxylic acids, such as lower aliphatic hydroxy-hydro-carbon polycarboxylic acids, e.g. tartaric or citric acid, or lower aliphatic unsaturated hydrocarbon polycarboxylic acids, e.g. maleic acid.

The new guanidine derivatives may be used as medicaments in the form of pharmaceutical preparations, which contain the new compounds or the salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, propylene glycol, polyalkylene glycols, petroleum jelly or any other known carrier for medicaments. The pharmaceutical preparations may be in solid form, for example, as tablets, dragees or capsules, or in liquid form, for example, as solutions, suspension or emulsions. If desired, they may contain auxiliary substances, such as preserving, stabilizing, wetting or emulsifying agents, salts for varying the osmotic pressure or buffers and the like. They may also contain, in combination, other therapeutically useful substances.

The new guanidine compounds of this invention are preferably prepared by treating a (2-pyridyl)-lower alkyl-amine, in which the lower alkyl radical has the above-given meaning, or a salt thereof, with an S-lower alkyl-isothiourea or an O-lower alkyl-isourea or a salt thereof, and, if desired, converting a resulting compound into its acyl derivative, and/or, if desired, converting a resulting salt into the free compound, and/or, if desired, converting a free compound into a salt or a quaternary ammonium compound thereof.

The isothiourea or the isourea compounds used to form the guanidine derivatives are preferably employed as their acid addition salts, particularly as their salts with mineral acids, such as hydrohalic acids, e.g. hydrochloric or hydrobromic acid, or primarily with sulfuric acid. An S-lower alkyl or an O-lower alkyl radical is especially an S-ethyl or O-ethyl, or particularly, an S-methyl or an O-methyl radical. The isothiourea or isourea compounds used in the reaction may be otherwise unsubstituted or the amino and/or imino group of these reactants may be substituted by lower hydrocarbon radicals, such as lower alkyl, e.g. methyl or ethyl; such N-substituted isothiourea or isourea compounds provide for the formation of guanidine compounds in which the amino and/or imino group of the guanidino portion is substituted. The preferred reagents to form a guanidino group are the S-lower alkyl-isothioureas; the S-methyl-isothiourea sulfate is primarily used to form guanidine compounds, which contain N-unsubstituted guanidino groups. The (2-pyridyl)-lower alkyl-amine is generally used in the form of the free base.

The reaction is carried out by contacting the two starting materials, preferably in the presence of a solvent, the choice of which depends primarily on the solubility of the reactants. Water or water miscible organic solvents, such as lower alkanols, e.g. methanol, ethanol, propanol, isopropanol or tertiary butanol, ethers, e.g. p-dioxane, ketones, e.g. acetone or ethyl methyl ketone, lower alkanoic acids, e.g. acetic acid, formamides, e.g. dimethylformamide, or aqueous mixtures of such solvents may be used as solvents. The reaction may be carried out at room temperature, or, if necessary, at an elevated temperature, for example, under reflux. An absence of oxygen may be achieved by performing the reaction in the atmosphere of an inert gas, e.g. nitrogen, and, if necessary, it may be carried out under pressure in a closed vessel.

The starting materials used in the above reaction are known, or, if new, may be prepared according to procedures used for the manufacture of known analogs. Thus, S-lower alkyl-isothioureas or O-lower alkyl-isoureas may be prepared, for example, by alkylating thioureas or ureas, in which at least one of the nitrogen atoms carries a hydrogen atom, with a lower alkyl halide, e.g. methyl or ethyl chloride, bromide or iodide, or with a bis-lower alkyl-sulfate, e.g. dimethyl or diethyl sulfate.

The (2-pyridyl)-lower alkyl-amines may be prepared, for example, by converting in 2-pyridyl-nitriles or (2-pyridyl)-lower alkyl-nitriles the nitrile group to a methylamino group by catalytic hydrogenation, such as, by treatment with hydrogen in the presence of a catalyst containing a metal of the eigth group of the periodic system, e.g. palladium on charcoal or Raney nickel, or, preferably, by treatment with a light metal aluminum hydride, for example, lithium aluminum hydride or sodium aluminum hydride, magnesium aluminum hydride, aluminum borohydride or aluminum hydride, which hydrides may be used, if desired, in the presence of an activator, such as aluminum chloride.

Furthermore, a 2-vinyl-pyridine may be converted to the 2-(2-pyridyl)-ethyl-amine by treating the former with phthalimide in the presence of a base, such as a quaternary ammonium hydroxide, and hydrolyzing the N-substituted phthalimide, for example, with hydrazine hydrate.

Acyl derivatives of the guanidine compounds of the present invention may be prepared, for example, by treating a resulting guanidine compound with the reactive derivative of a carboxylic acid, for example, with a halide, e.g. chloride, or with the anhydride of a carboxylic acid. The reaction is preferably carried out in an inert solvent, for example, in a hydrocarbon, such as an aliphatic hydrocarbon, e.g. hexane, or an aromatic hydrocarbon, e.g. benzene, toluene or xylene, or in a tertiary organic base, such as a liquid pyridine compound, e.g. pyridine or collidine.

Depending on the conditions used, the new guanidine compounds may be obtained in the form of the free compounds or as the salts thereof. A salt may be converted into the free compound in the customary way, for example, by treatment with an aqueous alkaline reagent, such as an alkali metal hydroxide, e.g. lithium, sodium or potassium hydroxide, an alkali metal carbonate, e.g. lithium, sodium or potassium carbonate or hydrogen carbonate or ammonia. A free base may be transformed into its therapeutically useful acid addition salts by reacting the free base with an appropriate inorganic or organic acid, such as one of those outlined hereinabove, if desired, in solution with a solvent, such as, for example, a lower alkanol, e.g. methanol, ethanol, propanol or isopropanol, or an ether, e.g. diethylether or p-dioxane, or in a mixture of solvents.

The guanidine compounds may be converted into the quaternary ammonium compounds by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid. Such esters are specifically lower alkyl halides, e.g. methyl, ethyl or n-propyl chloride, bromide or iodide, or lower alkyl lower alkane sulfonates, e.g. methyl or ethyl methane or ethane sulfonate. The quaternizing reaction may be performed in the presence or absence of a solvent, at room temperature or under cooling, at atmospheric pressure or in a closed vessel under pressure. Suitable solvents are more especially lower alkanols, e.g. methanol, ethanol, propanol, isopropanol, tertiary butanol or pentanol, lower alkanones, e.g. acetone or ethyl methyl ketone, or organic acid amides, e.g. formamide or dimethylformamide.

Resulting quaternary ammonium compounds may be converted into the corresponding quaternary ammonium hydroxides, for example, by reacting resulting quaternary halides with silver oxide, or quaternary ammonium sulfates with barium hydroxide, or by treating the quaternary ammonium salts with an anion exchanger, or by electrodialysis. From the resulting base there may be formed therapeutically suitable quaternary ammonium salts by reaction with acids, for example, with those outlined hereinbefore as being useful for the preparation of acid addition salts. A resulting quaternary ammonium compound may also be converted directly into another quaternary ammonium salt without conversion into the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol.

The invention also comprises any modification of the general process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example 1*

A solution of 5 g. of 2-(2-aminoethyl)-pyridine and 5.7 g. of S-methyl-isothiourea sulfate in 5 ml. of water is refluxed for 7 hours and then concentrated. The solid is filtered off and recrystallized from a mixture of ethanol and water to yield the 2-(2-pyridyl)-ethyl-guanidine sulfate, M.P. 147–150° (with decomposition).

*Example 2*

By treating a mixture of 2-(3-aminopropyl)-pyridine and S-ethyl-isothiourea sulfate in water according to the procedure of Example 1 the 3-(2-pyridyl)-propyl-guanidine sulfate may be formed.

The resulting sulfate may be dissolved in a minimum amount of water, aqueous ammonia may be added and the free base extracted with ether. Upon evaporating the ether solution the free base may be isolated, which may then be converted to the hydrochloride by adding an ether solution of hydrogen chloride to an ethanol solution of the 3-(2-pyridyl)-propyl-guanidine.

The compounds of the invention may also be prepared by reacting the (2-pyridyl)-lower alkyl-amine with a salt of a 1-guanyl-pyrazole derivative, for example, the nitrate of 1-guanyl-3,5-dimethyl-pyrazole. Although the reaction may proceed without the presence of a solvent, a lower alkanol, e.g. ethanol, may be used as a diluent. The reaction is preferably carried out at an elevated temperature; in the absence of a solvent, the two reactants may be fused together at an elevated temperature.

Furthermore, the products of this invention may be obtained by reacting a salt of a (2-pyridyl)-lower alkylamine with cyanamide, if desired, in an aqueous or a lower alkanol, e.g. methanol or ethanol, solution, or by fusing the two reactants at an elevated temperature. Salts of the starting materials are primarily those with mineral acids, such as hydrohalic acids or, primarily, sulfuric acid.

What is claimed is:

1. (2-pyridyl)-lower alkyl-guanidine, in which lower alkyl, of from two to three carbon atoms, separates the 2-pyridyl portion from the guanidino group by two to three carbon atoms.
2. 2-(2-pyridyl)-ethyl-guanidine.
3. 2-(2-pyridyl)-ethyl-guanidine sulfate.
4. 3-(2-pyridyl)-propyl guanidine.
5. The therapeutically acceptable acid addition salts of (2-pyridyl)-lower alkyl-guanidine, in which lower alkyl of from two to three carbon atoms, separates the 2-pyridyl portion from the guanidino group by two to three carbon atoms.

References Cited in the file of this patent

FOREIGN PATENTS 579,145   Germany _____ June 21, 1933

OTHER REFERENCES

Fromherz et al.: Chemical Abstracts, vol. 42, pages 8956–57 (1948).